Figure 1:
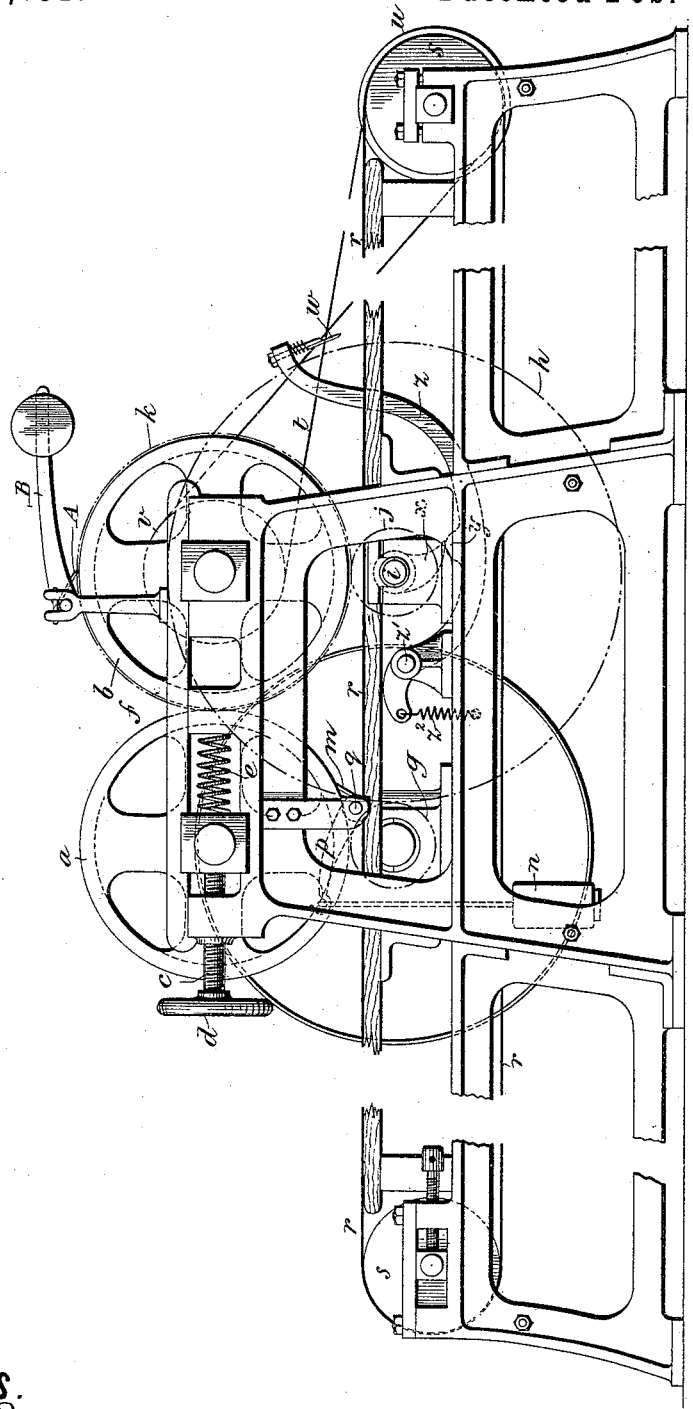

(No Model.) 3 Sheets—Sheet 1.

H. M. STEINTHAL.
MACHINE FOR RUNNING PLASTIC MATERIAL UPON TRAVELING SURFACES.

No. 420,631. Patented Feb. 4, 1890.

WITNESSES.
John Becker
C. K. Fraser.

INVENTOR.
Henry Michael Steinthal,
By his Attorneys,
A. C. Fraser & Co.

N. PETERS, Photo-Lithographer, Washington, D. C.

(No Model.) 3 Sheets—Sheet 3.

H. M. STEINTHAL.
MACHINE FOR RUNNING PLASTIC MATERIAL UPON TRAVELING SURFACES.

No. 420,631. Patented Feb. 4, 1890.

WITNESSES.
John Becker
C. K. Fraser.

INVENTOR.
Henry Michael Steinthal,
By his Attorneys,
A. C. Fraser

UNITED STATES PATENT OFFICE.

HENRY MICHAEL STEINTHAL, OF SCARBOROUGH, COUNTY OF YORK, ENGLAND.

MACHINE FOR RUNNING PLASTIC MATERIAL UPON TRAVELING SURFACES.

SPECIFICATION forming part of Letters Patent No. 420,631, dated February 4, 1890.

Application filed July 5, 1889. Serial No. 316,594. (No model.)

*To all whom it may concern:*

Be it known that I, HENRY MICHAEL STEINTHAL, floor-cloth manufacturer, a subject of the Queen of Great Britain, residing at Scarborough, in the county of York, England, have invented certain new and useful Improvements in Machines for Running Plastic Material Upon Traveling Surfaces and Dividing it into Sections or Lengths, of which the following is a specification.

My invention consists of a machine for running plastic material upon traveling surfaces and dividing it (when required) into sections or lengths. The machine has been specially designed for running paint composition of about the consistence of putty upon zinc plates or "pads" carried by an endless traveling band and for dividing the continuous layer or sheet of paint composition thus produced into lengths or sections corresponding with the length of the plates or pads, so that these plates with their covering of paint composition may be subsequently dried and the paint then stripped off and used in the manufacture of floor-cloths, wall-coverings, or other like purposes. The invention applies, however, to running other plastic material of like consistence upon traveling surfaces and dividing it when required into lengths or sections.

My machine consists, essentially, of, first, two horizontal revolving cylinders placed at such a distance apart as to allow a continuous thin stream or sheet of the paint composition or plastic material to run through between them, one of these cylinders having a greater surface speed than the other, so that the plastic material will all adhere thereto; second, a knife or stripper for removing the sheet of material from the faster-revolving cylinder, to which it will adhere; third, a traveling surface upon which the material falls as it is stripped from the cylinder, and, fourth, a reciprocating knife or cutter which cuts the material transversely into lengths or sections as it moves along with the traveling surface. This knife may be dispensed with in cases where the material is not required to be divided.

Having explained the main features of the machine, I will proceed to describe more in detail the manner in which it can be constructed, and for this purpose I will refer to the accompanying drawings, in which—

Figure 2:
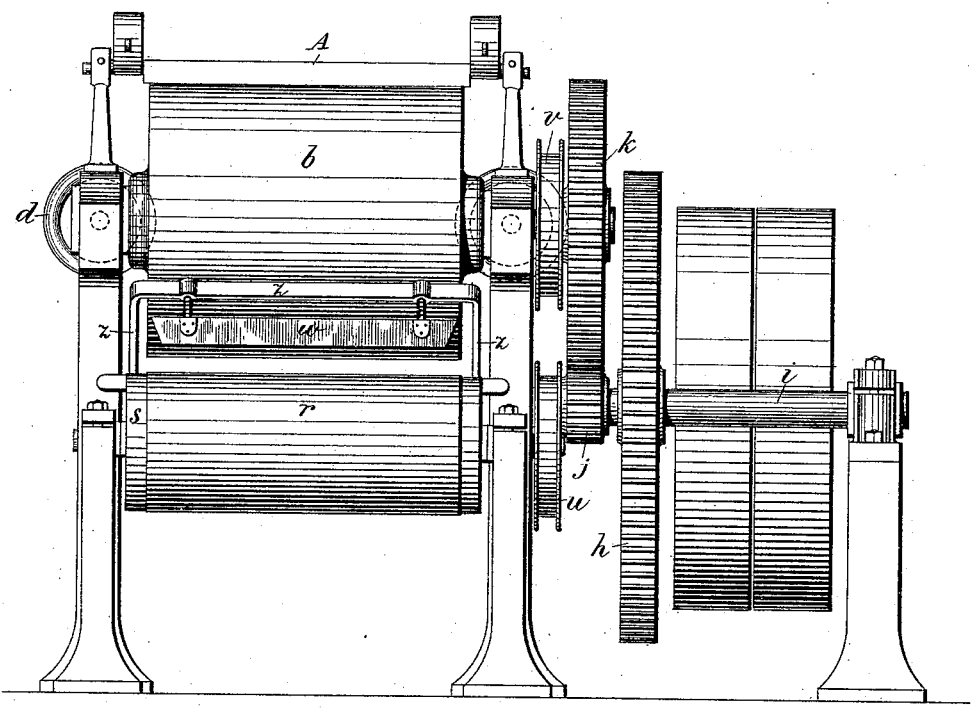
Figure 3:
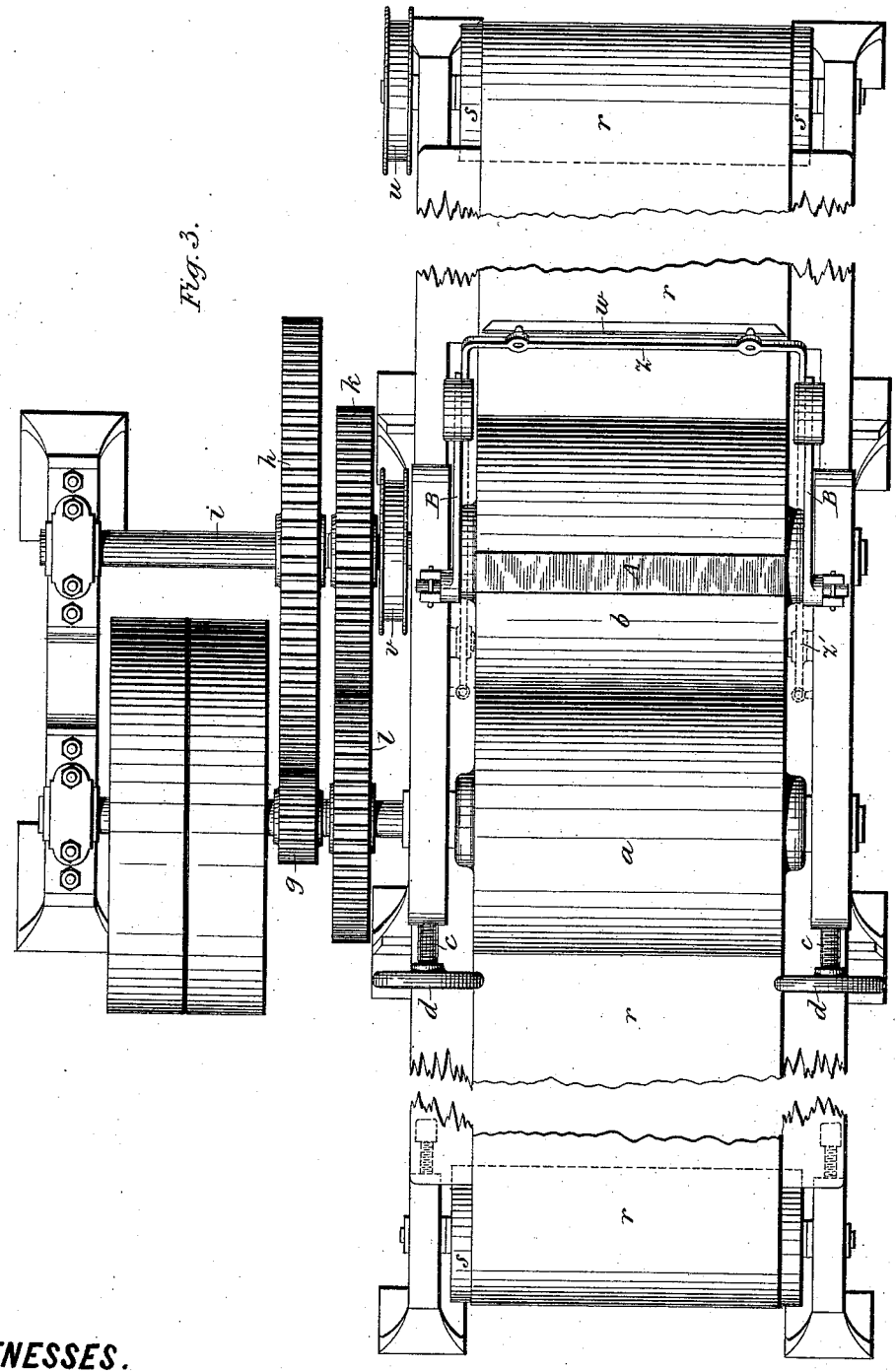

Figure 1 is a side elevation, Fig. 2 an end elevation, and Fig. 3 a plan, of a machine in which my invention is embodied.

In suitable bearings I mount two horizontal cylinders $a$ and $b$, whose surfaces are at a slight distance from each other—say about one-eighth of an inch. The distance between the surfaces is capable of regulation according to the thickness of the sheet required, and this regulation can be conveniently effected by means of screws $c\ c$, fitted with hand-wheels $d\ d$, these screws when rotated serving to shift the bearings of the cylinder $a$. Springs $e$ act upon the opposite side of the bearings.

The cylinders $a$ and $b$ are caused to revolve in reverse directions, so that the plastic material which is placed in the hopper-like space $f$ between them may be carried or allowed to flow in a thin stream or sheet through the space of one-eighth of an inch, (more or less,) as above described. One of these cylinders—viz., $a$—is driven at a greater surface-speed than the other $b$, (in the ratio of, say, 7 to 6,) and the sheet of material consequently adheres to cylinder $a$. The cylinders $a$ and $b$ can be driven by any convenient gearing. According to the arrangement for this purpose shown in the drawings a pinion $g$ on the driving-shaft drives a wheel $h$ on a shaft $i$, on which is a pinion $j$, gearing in turn with a wheel $k$ on the shaft of the cylinder $b$. The wheel $k$ meshes with a wheel $l$ of somewhat smaller diameter on the shaft of the cylinder $a$. Below and in contact with the cylinder $a$ is a stationary knife or stripper $m$, which, as the cylinder $a$ revolves, strips off the material in a continuous sheet. The knife $m$ is kept in contact with the cylinder by means of a weight $n$, hung from an arm $p$, fixed to the spindle $q$, on which the knife is mounted. Below the level of the knife $m$ is an endless traveling band $r$, upon which (for most purposes) are laid in continuation of each other zinc plates or pads. (Not shown.) These plates or pads receive the continuous sheet of the material as the same is stripped off the cylinder. The band $r$ passes over rollers $s\ s$ at the two ends of the machine and receives its motion by means of a belt $t$, which passes over a pulley $u$ on the shaft of one of the rollers $s\ s$ and over a pulley $v$ on the shaft of the cylinder $b$. Beyond the cylinders $a\ b$ is a transverse knife or cutter $w$, having a rising-and-falling movement so timed in relation to the onward movement of the band and pads that at each descent it divides the plastic material between two adjoining pads. The rising-and-falling movement of the knife $w$ can be produced in any suitable manner. The preferred arrangement is shown in the drawings, and consists of a cam $x$, mounted on the shaft $i$ and acting on a boss $y$ on a frame $z$, on which the knife is carried. This frame is pivoted at $z'$, and is fitted with springs $z^2$, which tend to keep the knife raised. At every turn of the shaft $i$ the cam forces down the knife to make the cut, and then the springs $z^2$ raise the knife again. The pads in their further onward movement with the band $r$ thus carry each a separate length or section of the material, and are removed at the rear end of the machine. Fresh pads are of course continuously supplied at the front end of the machine, being placed upon the band $r$.

A is a knife for cleaning the surface of the cylinder $b$. It is kept in contact therewith by weighted arms B B. Any small portions of material which adhere to the cylinder $b$ are scraped off by and accumulate at this knife, and should be removed by hand from time to time.

What I claim, and desire to secure by Letters Patent, is—

1. A machine for running plastic material upon a traveling surface, comprising two horizontal rotating cylinders set at such a distance apart as to allow a thin stream or sheet of plastic material to run through between them, means for driving these cylinders at differential speeds, a knife or stripper for removing the sheet from the faster rotating-cylinder, and a traveling surface upon which the sheet falls as it is stripped from this cylinder, substantially as set forth.

2. In a machine for running plastic material upon a traveling surface and dividing it into sections or lengths, the combination of two horizontal rotating cylinders set at such a distance apart as to allow a thin stream of plastic material to run between them, means for driving these cylinders at differential speeds, a knife or stripper for removing the sheet from the faster-rotating cylinder, a traveling surface upon which the sheet falls as it is stripped from this cylinder, and a reciprocating knife or cutter to cut the sheet transversely into lengths or sections as it moves with the traveling surface, substantially as set forth.

3. In a machine for running plastic material upon a traveling surface and dividing it into sections or lengths, the combination of two horizontal rotating cylinders set at such a distance apart as to allow a thin stream of plastic material to run between them, means for driving these cylinders at differential speeds, a knife or stripper for removing the sheet from the faster-rotating cylinder, a traveling surface upon which the sheet falls as it is stripped from this cylinder, a reciprocating knife or cutter to cut the sheet transversely into lengths or sections as it moves with the traveling surface, and a knife or scraper to clean the surface of the slower-rotating cylinder, substantially as set forth.

4. The combination, with the rotating cylinder $a$, rotating cylinder $b$, moving at less speed than cylinder $a$, knife or stripper $m$, kept in contact with cylinder $a$, endless traveling band $r$, reciprocating knife or cutter $w$, and its pivoted frame $y$, of the cam $x$ and springs $z^2$, for operating the said knife or cutter $w$, substantially as set forth.

In witness whereof I have hereunto signed my name in the presence of two subscribing witnesses.

HENRY MICHAEL STEINTHAL.

Witnesses:
CHARLES STEWART WARDELL,
ARTHUR SLEIGHTHOLM.